United States Patent [19]

Scruggs et al.

[11] Patent Number: 5,172,737

[45] Date of Patent: Dec. 22, 1992

[54] METHOD AND APPARATUS FOR CALIBRATING A TENSION TOOL

[75] Inventors: Michael G. Scruggs; W. David Kelly, both of Orlando, Fla.

[73] Assignee: Daniels Manufacturing Corporation, Orlando, Fla.

[21] Appl. No.: 737,354

[22] Filed: Jul. 29, 1991

[51] Int. Cl.⁵ .............................................. G01L 25/00
[52] U.S. Cl. ................. 140/123.5; 73/862.42
[58] Field of Search ............... 73/1 B, 862.42; 140/93.4, 123.5

[56] References Cited

U.S. PATENT DOCUMENTS

| | | | |
|---|---|---|---|
| 2,390,802 | 12/1945 | Mars | 73/862.42 |
| 3,882,719 | 5/1975 | Fletcher et al. | 73/862.42 |
| 4,996,868 | 3/1991 | Tonkiss | 73/862.42 |
| 5,000,232 | 3/1991 | Wolcott | 140/93.4 |

*Primary Examiner*—Lowell A. Larson
*Attorney, Agent, or Firm*—James H. Beusse

[57] ABSTRACT

A calibration tool comprises two relatively movable elements. A compression spring is operatively positioned between the first and second elements for resisting closure of the elements with respect to each other. Displacement of the first element is determined with respect to the second element when the spring is compressed by a predetermined pressure. A connecting element, such as a band, is coupled to the calibration tool and to the tensioning apparatus such that actuation of the tensioning apparatus causes the band to effect relative movement of the first and second elements whereby the force exerted by the tensioning apparatus is determined.

7 Claims, 3 Drawing Sheets

METHOD AND APPARATUS FOR CALIBRATING A TENSION TOOL

The present invention relates to tension tools and, more particularly, to a method and apparatus for calibrating a banding tool or similar device requiring precise tension calibration.

BACKGROUND OF THE INVENTION

One type of tension tool is a banding tool for which the disclosed embodiment of the present invention is particularly adapted. An exemplary banding tool is shown in co-pending application Ser. No. 07/681,557 filed Apr. 5, 1991 and assigned to the assignee of the present invention, the disclosure of which is hereby incorporated by reference. As described therein, banding tools are utilized for tightening a band about an object to within preselected tension limits. One specific application is to tighten and secure a metal band about a woven metal braid portion of an electrical cable about a tubular termination sleeve portion of an electrical connector. In general, a banding tool includes a housing, a reciprocal shuttle mounted in the housing for gripping a band, and a pivotable lever coupled to the shuttle and extending from the housing. Actuation of the lever causes motion of the shuttle in a direction to effect tightening of the band. A return spring is coupled to the lever to return the lever to L ion The shuttle has a first part a non-actuated posit which supports the grip and a second part which connects to the lever arm. A spring holds the second part in a preselected position with respect to the first part. The second part is movable with respect to the first part when tension exerted on the band exceeds the instantaneous force of the spring. A trip mechanism is connected to the lever and arranged to transition to a tripped position when the lever is moved to a preselected end position. The shuttle is reciprocally moved a preselected distance by motion of the lever. This distance allows the linkage to retract from an overcenter position in response to force from the return spring. Relative displacement between the first and second parts of the shuttle limits reciprocal motion of the shuttle to a second distance less than the preselected distance when tension on the band is within the preselected tension limits whereby the trip mechanism is forcibly retained in the tripped position to prevent release of the lever to the non-actuated position.

The first part of the shuttle includes forward and aft members. The forward member has a slot extending therethrough for passage of a band. A pawl pivotally mounted to the forward member is adjacent the slot. One end of the pawl intersects the slot when the pawl is pivoted in a first direction. A linkage element connects a second end of the pawl and the aft member with a spring positioned between the forward member and the aft member for urging the members in opposite directions until retrained by the link. The pawl is pivoted in the first direction when the forward member is spaced from the aft member and the pawl is urged in a second direction for releasing a band in the slot when the aft member is urged toward the forward member.

The above mentioned spring, which sets the band tension limit at which the lever (or trigger) is held in a retracted position by virtue of the force on the trip mechanism, is disclosed as a stack of Belleville washers. The band tension limit is set by adjusting a screw to compress the washers. Although the washers are relatively stable in maintaining their set tension limit, ordinary wear and vibration of the tool may result in variation in the set limit. It is therefore desirable to provide a method and apparatus for periodically calibrating such banding tools.

SUMMARY OF THE INVENTION

The above and other desirable features and advantages are attained in a transportable, hand-held calibration tool adapted for use with the aforementioned banding tool and related tensioning apparatus. In one form, the calibration tool comprises two relatively movable elements. A compression spring is operatively positioned between the first and second elements for resisting closure of the elements with respect to each other. Displacement of the first element is determined with respect to the second element when the spring is compressed by a predetermined pressure. A connecting element, such as a band, is coupled to the calibration tool and to the tensioning apparatus such that actuation of the tensioning apparatus causes the band to effect relative movement of the first and second elements whereby the force exerted by the tensioning apparatus is determined.

Determining displacement of the calibration tool includes adjustably coupling the first element for setting a preselected measuring displacement when the spring is compressed to the predetermined pressure. Further, determining displacement includes a go/no-go gauge insertable between the adjustable element and the second element for determining relative displacement therebetween.

The first and second elements comprise outer and inner telescoping members, respectively. The outer member has a stop adjacent one end thereof and the compression spring is positioned within the outer member against the stop. One end of the inner member compressively urges the spring against the stop when the inner member is assembled into the outer member.

The adjustable element comprises a collar coupled adjacent another end of the inner member. This collar is fixedly maintained in a preselected position on the inner member, and the displacement is measured between a point on the outer member and the collar when the spring is compressed by actuation of the tensioning apparatus.

BRIEF DESCRIPTION OF THE DRAWINGS

For a better understanding of the present invention, reference may be had to the following detailed description taken in conjunction with the accompanying drawings in which.

DETAILED DESCRIPTION OF THE INVENTION

Figure 1:
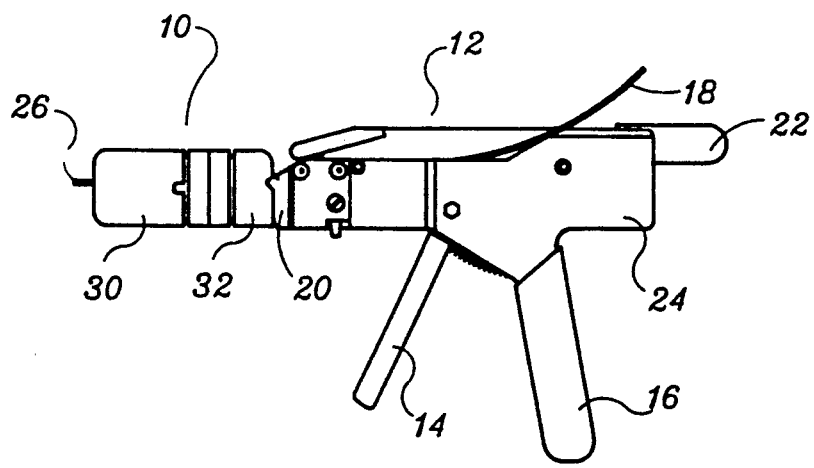
FIG. 1 is a simplified view of a banding tool operatively coupled to a calibration tool of the present invention.

FIG. 1 illustrates a calibration tool 10 in operative position with respect to a tensioning tool, herein illustrated as a manual banding tool or apparatus 12. The tool 12 may be substantially as shown in the aforementioned U.S. patent application Ser. No. 07/681,557 and includes a trigger or pivotable lever handle 14 which is pivoted toward fixed handle 16 in order to advance or tension a band 18 inserted in the tool 12. The tool 12 is so designed that when a preselected tension is placed on band 18, the trigger 14 is tripped into a position adjacent handle 16 and does not release until tension on the band is released by cutting the band adjacent a nose 20 of the tool 12. A cutting lever 22 attached to the tool 12 is used to sever the band 18. Within an outer housing of tool 12 generally adjacent an end 24, there is an adjustment means (not shown) which allows setting of the predetermined band tension at which the trigger 14 trips and inhibits further tensioning.

In order to periodically confirm the accuracy of the band tension setting of tool 12, the calibration tool 10 may be used with tool 12 in the manner shown. The band 18 is inserted through the calibration tool 10 and then into banding tool 12. The trigger 14 is preferably actuated in short strokes until the tool 10 is pulled snugly against the nose 20 of tool 12. The band 18 has a band buckle 26 at one end which engages and is retained at the distal end of calibration tool 10 so that the action of advancing the band 18 pulls the calibration tool 10 into contact with the banding tool 12.

Figure 2:
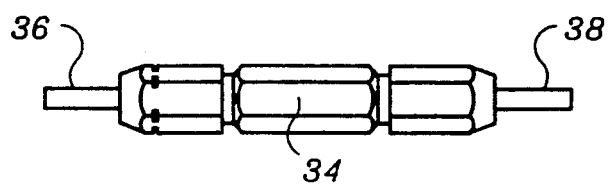
FIG. 2 is an illustration of a go/no-go gauge for use with the calibration tool of FIG. 1.

The calibration tool 10 comprises a first member 30 which is movable with respect to a second member 32. Compression springs within the tool 10 establish the amount of force needed to effect a preselected displacement of member 30 with respect to member 32. By measuring the relative displacement of member 30 with respect to member 32 when the trigger 14 trips, the amount of tension placed on the band 18 can be determined. For simplicity, it is desirable not to actually measure the displacement but rather to use a conventional go/no-go gauge to determine if the displacement is within an acceptable range. A typical go/no-go gauge is illustrated in FIG. 2 and simply comprises a holder 34 having a pin 36 of one diameter on one end and a pin 38 of a slightly larger diameter on another end. Pin 36 is a "go" gauge while pin 38 is a "no-go" gauge. In practice, displacement within acceptable limits occurs when pin 36 fits between members 30 and 32 while pin 38 does not fit.

Figure 3:
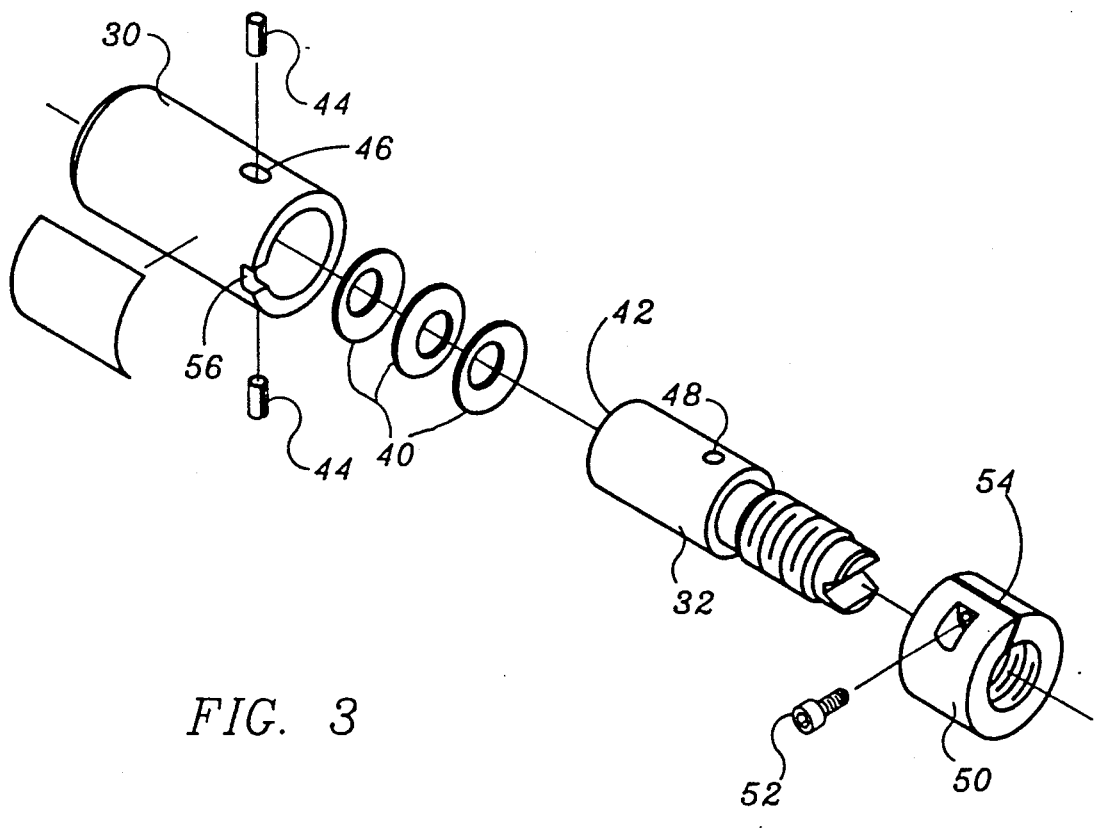
FIG. 3 is an exploded view of the calibration tool of FIG. 1.

Turning now to FIG. 3, there is shown an exploded view of calibration tool 10. Member 30 comprises an outer cap-like element while member 32 comprises an inner element which telescopes or slides within outer member 30. A compression spring means such as the illustrative Belleville washers 40 fit within the outer member 30 and are compressed against an end 42 of inner member 32. When assembled, the inner member 32 is retained in member 30 by a pair of roll pins 44 inserted through slots 46 in member 30 and into apertures 48 in member 32. The slots 46 are elongated in the direction of relative motion of members 30 and 32 sufficiently so as not to interfere with their relative displacement. Two pins 44 are used since an aperture is formed centrally and longitudinally of members 30, 32 for passage of the band 18.

The calibration tool 10 is itself calibrated by means of an adjustment collar 50. The collar 50 is a split collar adapted for receiving a threaded fastener 52 through slit 54 for effectively reducing the diameter of the collar when the fastener 52 is tightened. One end of member 32 is threaded and matching threads formed in collar 50 so that collar 50 can be threaded onto member 32. When the calibration tool 10 is assembled, the position of collar 50 can be set so that a predetermined spacing exists between collar 50 and member 30 when a preselected compressive force is exerted between members 30 and 32. However, rather than merely determining the spacing between collar 50 and member 30, a slot 56 is formed in member 30 at an edge adjacent collar 50 for receiving the pins 36, 38 of the gauge of FIG. 2.

Figure 4:
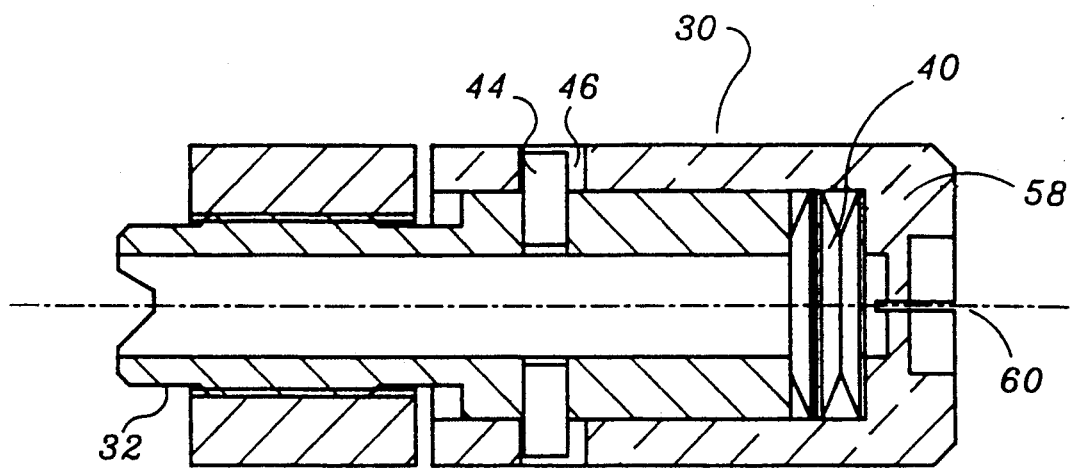
FIG. 4 is a cross-sectional view of the tool of FIG. 3.

Referring briefly to FIG. 4, there is shown a cross-sectional view of the calibration tool 10 in an assembled condition. Note that the outer member 30 has a closed end 58 functioning as a stop for restraining washers 40. A slot 60 formed in the end 58 is sized to pass the band 18 while preventing the buckle 26 from passing through. The pins 44 can be seen extending into the elongated slots 46.

Figure 5:
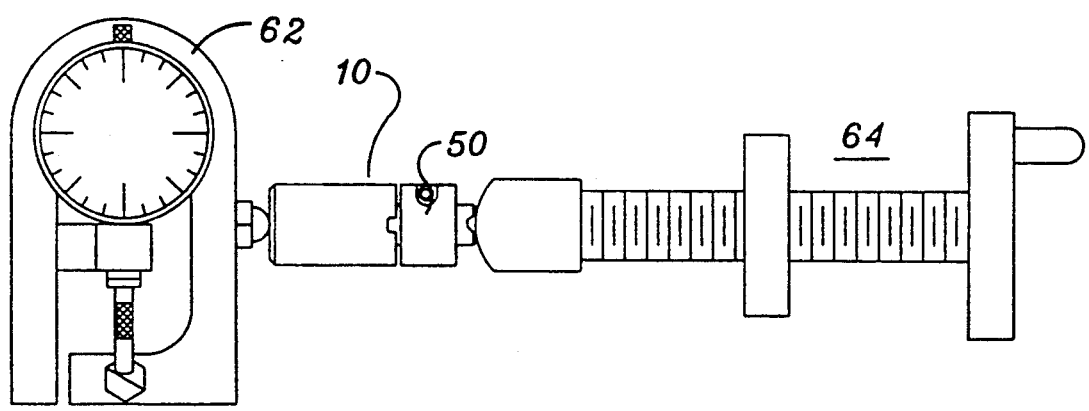
FIG. 5 illustrates a method for calibrating the calibration tool of FIG. 1.

Turning to FIG. 5, there is shown one method of calibrating the calibration tool 10. The tool 10 is placed in compression between a standard compressive type force gauge 62 and a compression apparatus 64 such as a threaded drive screw in a bench vise. The apparatus 64 is actuated until the force gauge 62 reads the desired compressive force, e.g., 150 psi. The collar 50 is then adjusted until the go pin 36 fits into slot 56 and no-go pin 38 does not fit. At this point, fastener 52 is tightened to hold collar 50 in the set position. The tool 10 is then calibrated for use in determining the tension setting of banding tool 12.

Figure 8:
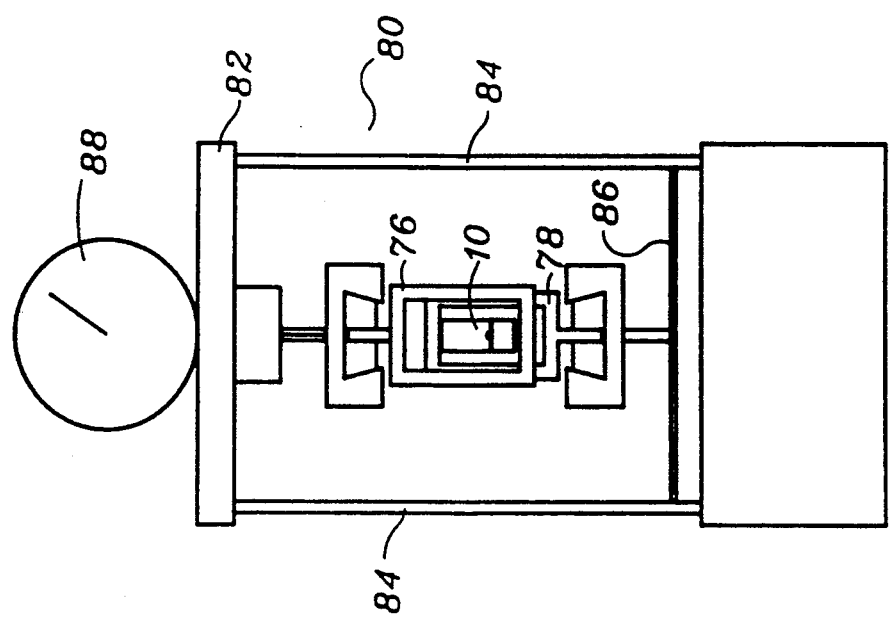
FIG. 8 illustrates application of the present invention for calibration of a tensile testing tool.
Figure 6:
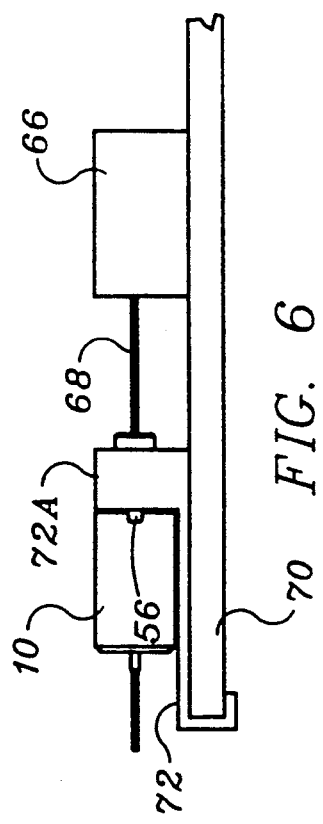
FIG. 6 illustrates application of the present invention for calibration of a cable tensioning tool.
Figure 7:
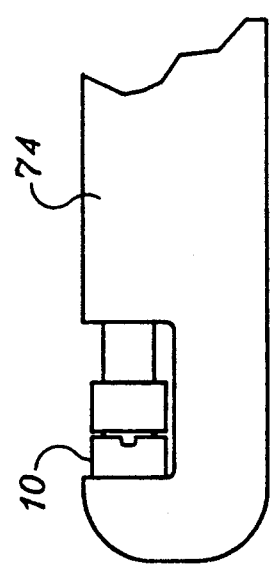
FIG. 7 illustrates application of the present invention for calibration of a crimping tool.

FIGS. 6-8 illustrate other applications of the calibration tool 10 with other forms of tensioning tools. In FIG. 6, tool 10 is used to calibrate a cable tensioning device 66 such as the "Safety Cable Tool" available from Bergen Cable Technologies. The device 66 is designed to pull a predetermined tension on a cable 68 and to trip at such predetermined tension similar to the above described banding tool 12. In order to confirm that device 66 trips at the correct tension, device 66 and tool 10 are fixed to a base member 70. A bracket 72 hooks over an end of member 70 and has a shelf portion 72A for supporting tool 10. The shelf portion 72A may have a central aperture for receiving member 32 of tool 10 and thereby eliminating the need for stop member 50. The tool 10 is used in the previously described manner with proper tension on cable 68 occurring when gauge pin 36 fits into slot 56 while gauge pin 38 does not.

In FIG. 7, the tool 10 is placed within the jaws of a crimping tool 74, which may be hydraulic or pneumatically operated. The jaws compress the tool 10 directly and jaw pressure of a predetermined value can be measured by using go/no-go gauge 34. FIG. 8 is similar to FIG. 7 in compressing the tool 10 but uses a pair of fixtures 76, 78 each coupled to opposite ends of a conventional tensile tester 80. Tester 80 has an upper member 82 supported on rods 84 from base member 86. Fixture 76 is connected to member 82 such that tension on fixture 76 is translated into a tension reading on scale 88. Fixture 78 is coupled to base member 86 which is displaceable with respect to member 82. The fixtures 76, 78 are arranged to engage opposite ends of tool 10 and place tool 10 in compression by displacement of member 86. The accuracy of scale 88 can be verified by use of go/no-go gauge 34 in the manner described above.

While the invention has been described in what is presently considered to be a preferred embodiment, various modifications and arrangements will become apparent to those skilled in the art. For example, the calibration tool may be adapted for use in calibrating other devices such as tensile testers, cable tension tools, hydraulic crimp tools, and other related testers and tools. It is intended, therefore, that the invention not be limited to the illustrative embodiment but be interpreted within the full spirit and scope of the appended claims.

What is claimed is:

1. A calibration tool for a tensioning apparatus comprising:
   a first and second relatively movable elements;
   compression spring means operatively positioned between said first and second elements for resisting closure of the elements with respect to each other, said spring means transitioning from minimum compressive force to maximum compressive force over a range of compression of about 0.125 inch;
   means for determining the displacement of said first element with respect to said second element when said spring means is compressed by a predetermined pressure, said displacement determining means including adjustable means coupled to one of said first and second elements for setting a preselected measuring displacement when said spring means is compressed to the predetermined pressure; and
   means for coupling said calibration tool to the tensioning apparatus such that actuation of the tensioning apparatus affects a closing movement of said first and second elements whereby the compressive force exerted by the tensioning apparatus is determinable by said displacement determining means.

2. The calibration tool of claim 1 wherein said displacement determining means includes a go/no-go gauge insertable between said adjustable means and another of said first and second elements for determining relative displacement therebetween.

3. The calibration tool of claim 1 wherein:
   said first and second elements comprise outer and inner telescoping members, respectively, said outer member having a stop adjacent one end thereof; and
   said compression spring means being positioned within said outer member against said stop, one end of said inner member compressively urging said spring means against said stop when said inner member is inserted in said outer member.

4. The calibration tool of claim 3 wherein:
   said adjustable means comprises a collar coupled adjacent another end of said inner member, said collar including means for fixedly maintaining said collar in a preselected position on said inner member; and
   said displacement being measured between a point on said outer member and said collar when said spring means is compressed by actuation of the tensioning apparatus.

5. The calibration tool of claim 4 wherein said outer and inner members each include a generally central, longitudinal aperture extending therethrough for passage of an elongated tensioning element, said one end of said outer member including means for engaging and retaining the tensioning element, said another end of said inner member being adapted for engaging an end of the tensioning apparatus, actuation of the tensioning apparatus effecting a compression of the spring means by pulling the tensioning element through said inner and outer members such that said retained end of the tensioning element pulls said outer member over said inner member restrained against the end of the tensioning apparatus.

6. The calibration tool of claim 5 wherein the tensioning apparatus includes a trigger release to prevent additional tensioning of the tensioning element when the element tension reaches a value settable by adjustment of the tensioning apparatus, the calibration tool providing a means for setting the trigger release to a preselected value corresponding to a predetermined displacement between said inner and outer members.

7. The calibration tool of claim 1 wherein said compression spring means comprises a plurality of Belville washers.

* * * * *